US005194115A

United States Patent [19]

Ramspeck et al.

[11] Patent Number: 5,194,115

[45] Date of Patent: Mar. 16, 1993

[54] LOOP PRODUCING APPARATUS

[75] Inventors: Alan R. Ramspeck, Cumming; Scott R. Miller, Roswell, both of Ga.

[73] Assignee: Nordson Corporation, Westlake, Ohio

[21] Appl. No.: 783,989

[22] Filed: Oct. 29, 1991

[51] Int. Cl.[5] .................... B32B 31/00

[52] U.S. Cl. .................... 156/578; 156/290; 239/298; 239/370; 239/421

[58] Field of Search .................... 156/290, 291, 578; 239/370, 371, 298, 418, 500, 422, 423, 424

[56] References Cited

U.S. PATENT DOCUMENTS

| | | | |
|---|---|---|---|
| Re. 33,481 | 12/1990 | Ziecker et al. | 239/298 |
| 3,421,702 | 1/1969 | O'Brien | 239/418 |
| 3,659,151 | 4/1972 | Fabre | 239/298 X |
| 3,888,649 | 6/1975 | Simhan | 118/718 X |
| 4,031,854 | 6/1977 | Sprague, Jr. | 118/641 |
| 4,055,300 | 10/1977 | Binoche | 239/418 X |
| 4,218,019 | 8/1980 | Baldwin et al. | 239/500 X |
| 4,815,660 | 3/1989 | Boger | 118/302 X |
| 4,983,109 | 1/1991 | Miller et al. | 239/298 X |

*Primary Examiner*—David A. Simmons
*Assistant Examiner*—James J. Engel, Jr.
*Attorney, Agent, or Firm*—Wood, Herron & Evans

[57] ABSTRACT

An improved loop producing apparatus includes an adhesive gun and a nozzle member for emanating a bead of adhesive in a spiral pattern caused by the direction of air jets toward the adhesive bead as it emanates from the nozzle. A plenum chamber just upstream of the nozzle member is provided with diffusing or baffling means for diffusing the flow of air before it is introduced to the bores in the nozzle member. Overlapping loops of an adhesive bead are deposited onto a substrate in very consistent loop widths and with little loop width variation independently of the angular orientation of the nozzle member.

31 Claims, 4 Drawing Sheets

LOOP PRODUCING APPARATUS

This invention relates to apparatus for depositing a stripe of adhesive on a substrate where the stripe comprises an adhesive bead deposited in an overlappinq pattern of loops, and more particularly to apparatus for controlling the width parameter of the loops.

In certain applications involving the deposit of adhesive onto substrates, it is known to eject or extrude a filament or bead of hot melt adhesive from a nozzle and to generate a spiral pattern in said filament so that the bead is deposited in a series of overlapping loops. A nozzle generally incorporates a plurality of air conducting bores surrounding a bead extrusion outlet for directing air jets toward the bead to cause it to take on a spiral configuration. When there is relative perpendicular movement between the spiraling adhesive bead and an underlying substrate, a stripe comprising a pattern of overlapping bead loops is deposited on the substrate.

One form of such apparatus is described in U.S. Pat. No. Re. 33,481, issued Dec. 11, 1990. In that patent, a nozzle attachment has an adhesive bore with an outlet surrounded by six bores defining air jets. The attachment is placed on an adhesive sprayer or gun such that the bores communicate with a plenum chamber fed with air from an elongated air passage. Pressurized air is supplied through the passage to the chamber where it exits through the six bores in the form of air jets to form the adhesive bead into a descending spiral as it is ejected from the adhesive bore.

Such apparatus has numerous uses including depositing adhesive for adhering a non-woven substrate to a polyurethane substrate, for example, in the manufacture of diapers. Another use is in the application of adhesive to one or more extended elastic members for adhering them to a synthetic substrate such as in the formation of gathered elastic leg openings for diapers.

In the manufacture of such goods, it is important to monitor the width of the adhesive stripe (i.e. loops) which are deposited. If the width is too narrow, desired adhesive coverage may not be obtained, resulting in leakage of the final product. This could occur, for example, in depositing a single stripe or series of loops along a plurality of elastic members. If the loops are too narrow, adhesive may not cover the outermost elastic elements.

On the other hand, in applications involving a plurality of side-by-side adhesive stripes, loops which are too wide in each stripe may overlap loops in an adjacent stripe producing an undesirably thickened adhesive area.

It has been discovered that while the nozzle attachment disclosed in the noted U.S. Pat. No. Re. 33,481, is useful in a number of applications, it produces loop patterns from run to run which have a rather large deviation in loop width from one run to another. This deviation specifically occurs from gun to gun, using similar nozzle attachments, and from run to run in the same gun where the nozzle attachment is rotated from one angular position to another as it is replaced for cleaning, bead size adjustment or the like.

It has accordingly been one objective of this invention to provide an improved adhesive applicator where deposited overlapping loops are in more uniform widths from run to run.

Another objective of this invention has been to provide an improved adhesive apparatus including a nozzle attachment for generating consistent width adhesive loops or spirals independently of angular orientation of the nozzle attachment.

To these ends, a preferred embodiment of the invention contemplates use of a nozzle attachment in an adhesive gun where air is fed to the attachment from an annular plenum but further including baffle or diffusing means in the plenum for eliminating variations in the air flow which may tend otherwise to vary the emanating loop width. The diffuser means in one embodiment includes flat, annular, spaced apart baffles, one mounted on the plenum's outer wall, and one on the plenum's inner wall. These baffles are disposed at least obliquely to the flow of air in the plenum and diffuse the air flow in the plenum so that consistent width loops are produced independently of the angular orientation of the nozzle attachment with respect to the plenum.

Preferably, two baffles are used. Each comprises a flat, washer-shaped element. A first baffle has convolutions about an external circumference, while a second baffle has an interior aperture defined by inwardly directed convolutions. These convolutions facilitate the press fit of the baffles into the annular air plenum chamber on the upstream side of the nozzle attachment. The first baffle is pressed into the plenum with its convoluted circumference holding it against the plenum's outer wall. The second baffle is pressed into the plenum with the convolutions around its interior aperture holding it on the internal wall of the plenum.

Air is supplied to the plenum upstream of the first baffle through a port directed toward the baffle surface. Air flows around the internal aperture edge of this baffle, between it and the interior plenum wall, onto the second baffle. From there, air flows between the outer circumferential edge of the second baffle and the outer wall of the plenum into a chamber upstream of the nozzle attachment. The entering air is thus directed in a tortuous path, tending to homogenize turbulence, so that air entering the air jet bores is essentially uniform from one bore to the next.

The generation of the spiral configuration in the bead emanating from the nozzle is uniform, regardless of the angular orientation of the nozzle attachment and its air jet bores with respect to the plenum and with respect to the air inlet port in the plenum chamber.

In another embodiment, a one-piece baffle is used as the diffuser means. The one-piece baffle is in the form of an elongated, cylindrically-shaped member having a through-bore for fitting on the interior wall of the plenum and an outer surface having spaced circumferential projections or flanges extending into the plenum chamber. These flanges create a tortuous path for air flowing in the plenum chamber between the air inlet port and the bores defining the spiral forming air jets. Loop width deviations are minimized independently of the angular orientation of the associated nozzle attachment. This embodiment may be preferred from a manufacturing standpoint since it facilitates manufacture and installation of the baffle or diffusing means as compared to the two-disk baffle means noted above.

These and other alternatives will become readily apparent from the following detailed description of a preferred embodiment and from the drawings, in which.

Figure 1:
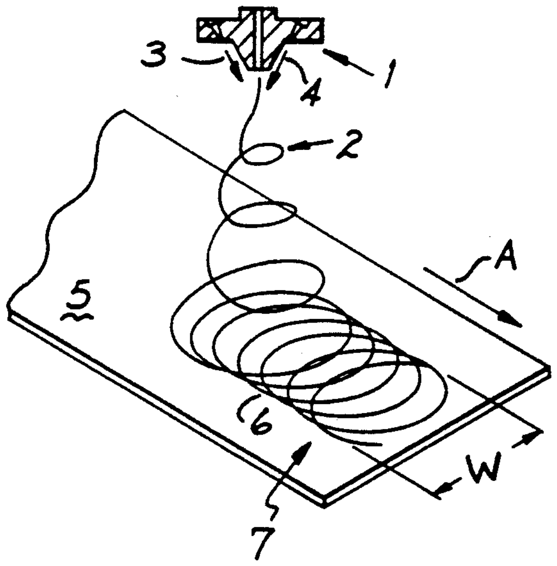
FIG. 1 is a diagrammatic isometric view generally illustrating the deposit of a series of overlapping adhesive loops on a substrate, according to known apparatus and procedures.

Referring now to the drawings, FIG. 1, diagrammatically illustrates a known method of producing a series of adhesive bead or filament loops in a stripe on an underlying substrate. FIG. 1 depicts a nozzle member 1, corresponding to the nozzle attachment disclosed in U.S. Pat. No. Re. 33,481, which is expressly incorporated herein by reference for background purposes. Nozzle member 1 ejects a bead or filament 2 of adhesive material. A plurality of fluid or air jets, such as jets 3 and 4, are directed toward the bead to cause it to form into a descending spiral pattern, as shown. In practice, six jets disposed around the emanating bead are used.

A substrate 5 is moved beneath the nozzle attachment 1 in the direction of arrow A. Accordingly, as the spiraling bead or filament 2 engages the substrate 5, there is formed thereon a series of overlapping loops 6 of the adhesive filament material defining a form of an elongated stripe 7 having generally a width "W". It has been found that the width W of each of the individual loops 6 in the stripe 7 is not consistent. Instead, the width of the loops deviates or varies to some extent from run to run.

It will be appreciated that FIG. 1 is illustrative only and is provided to show the concept of the deposition of a series of overlapping loops of an adhesive bead to define a stripe on an underlying substrate as heretofore known. It will be understood that a plurality of nozzle attachments could be used to deposit a plurality of such stripes on a substrate and it will be also appreciated that the stripe may be deposited onto a series of substrates, such as a plurality of adjacent elongated elastic members. Other applications may be contemplated as well.

Figure 2:
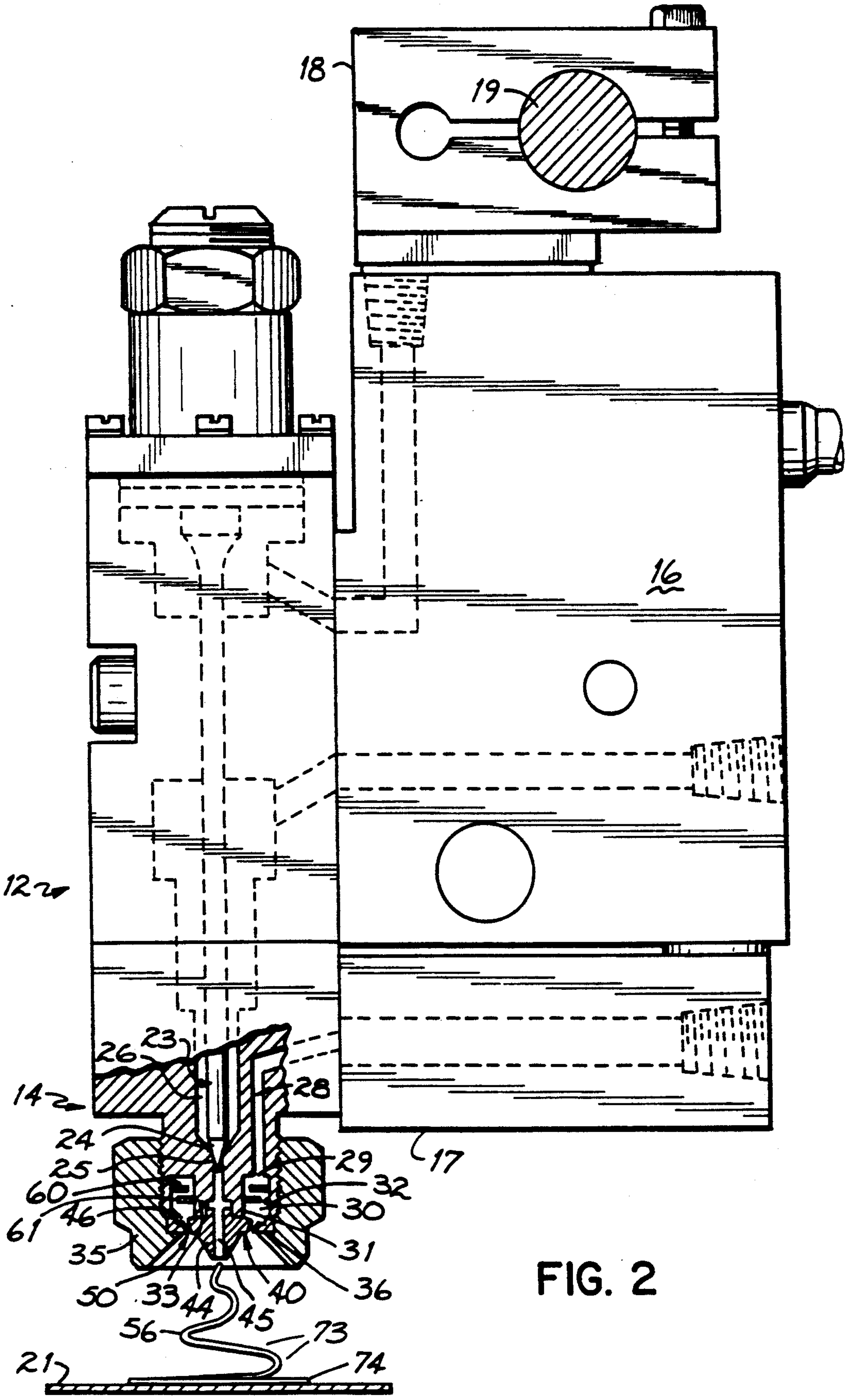
FIG. 2 is an elevational view, in partial cross-section, of an adhesive gun having a loop producing apparatus according to the invention.

Turning now to FIG. 2, there is shown therein an adhesive gun having a gun body or spray module 12, a nozzle end 14, an adhesive manifold 16 and a fluid or air manifold 17. The gun body or module 12, the nozzle end 14, adhesive manifold 16 and air manifold 17 are attached by a bracket means 18 to a support rod 19, for example, for supporting such apparatus above a substrate 21.

It will be appreciated that the gun or module 12 includes a valve stem 23, having a tapered valve surface 24 for cooperating with a seat 25 to shut off flow of adhesive from an adhesive chamber 26 through the nozzle, as will be described. At the lower portion of the nozzle end 14, there is an air passageway 28 opening at air passageway port 29 into a fluid or air plenum chamber 30.

The structure of the gun body or module 12 and the manifolds 16 and 17 are substantially identical to the model H200 spray gun manufactured and sold by the assignee of this invention, Nordson Corporation of Amherst, Ohio. With the exception of the following description regarding the lower portion of the nozzle end 14, the numbered apparatus elements mentioned above form no part of the invention by themselves, and are discussed only briefly herein, for background.

Figure 3:
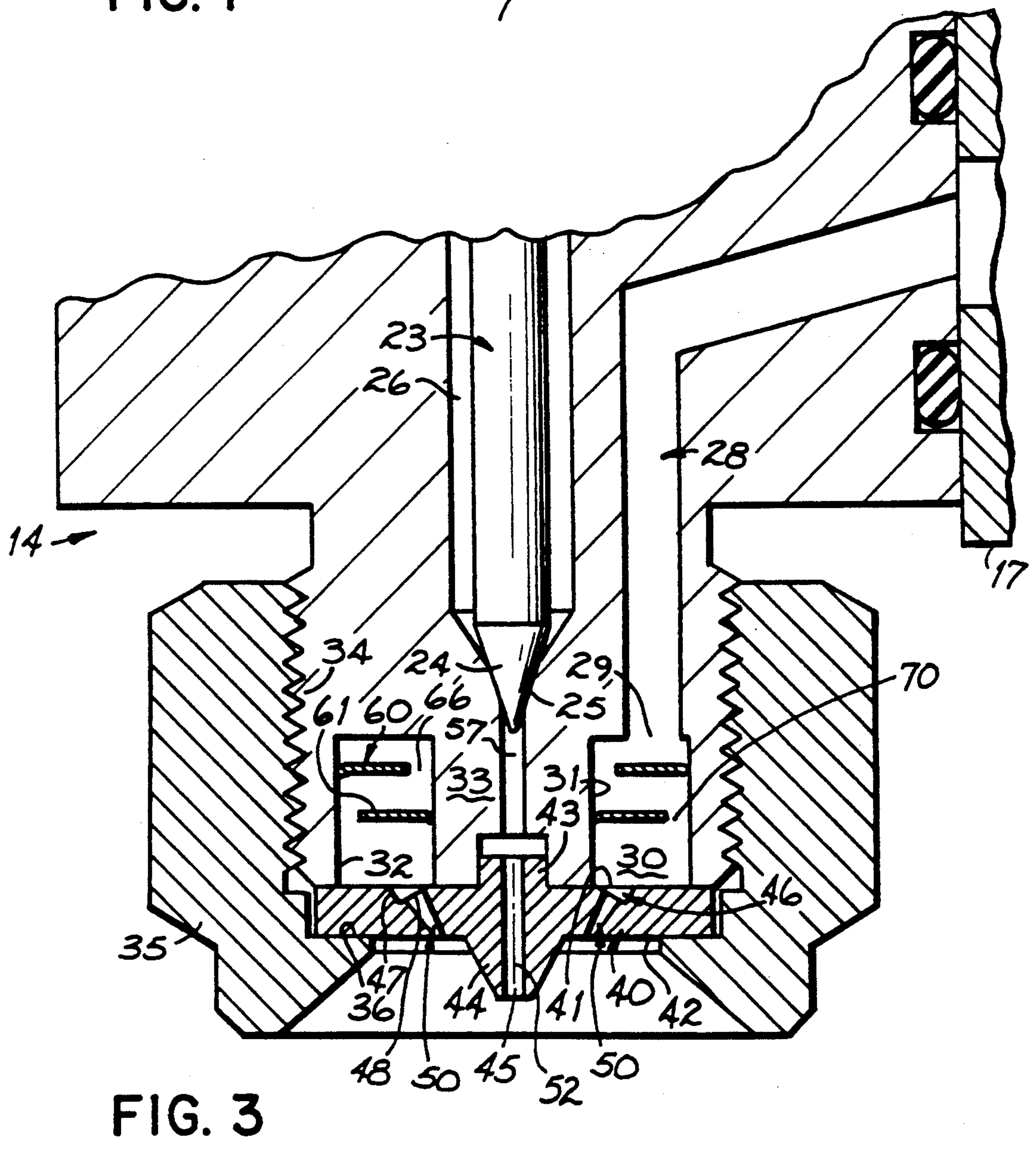
FIG. 3 is a cross-sectional enlarged view of the lower portion of the adhesive gun of FIG. 2.

Turning now to FIG. 3, chamber 30 is defined by an interior or inner cylindrical wall 31 and an exterior or outer cylindrical wall 32. The inner cylindrical wall 31 surrounds a forwardly extending projection or boss 33 of the nozzle end 14, while the outer cylindrical wall 32 of the chamber 30 comprises the internal wall of the threaded nozzle portion 34. Chamber 30 may be slightly deeper than the corresponding plenum chamber shown in the aforesaid U.S. Pat. No. Re. 33,481.

A cap 35, as best seen in FIG. 3, is threaded onto the nozzle 14 about the portion 34 and is provided with a shoulder 36 for securing a nozzle member 40 on the forward end of the nozzle. This nozzle member is described in U.S. Pat. No. Re. 33,481.

The nozzle member 40 is an annular plate having one side formed with a first or upper surface 41 and an opposite side formed with a second or lower surface 42 spaced from the upper surface 41. A boss 43 extends outwardly from the upper surface 41 and a nozzle tip 44 extends outwardly from the lower surface 42 in alignment with the boss 43. A through bore 45 is formed in the nozzle member 40 between the boss 43 and the nozzle tip 44. The through bore 45 has a diameter in the range of about 0.010 to 0.040 inches.

An annular V-shaped groove 46 is formed in a nozzle member 40 and extends inwardly from the upper surface 41 toward the lower surface 42. The annular groove defines a pair of sidewalls 47, 48, which are substantially perpendicular to one another. In a presently preferred embodiment, the sidewall 48 is formed at approximately a 30 degree angle with respect to the planar upper surface 41 of the nozzle member 40.

Figure 4:
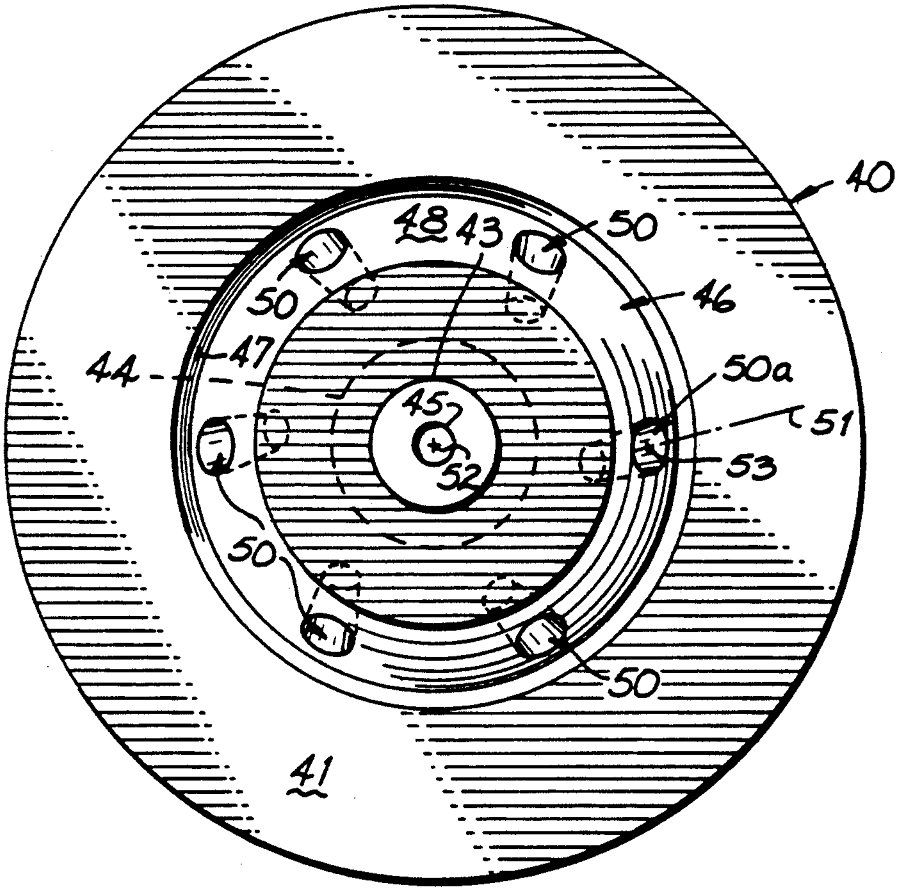
FIG. 4 is a plan view of the nozzle attachment of FIGS. 1–3.

As best shown in FIG. 4, six air jet defining bores 50 are formed in the nozzle member 40 between the annular groove 46 and the lower surface 42, preferably at an angle of about 30 degrees with respect to the longitudinal axis of the through bore 45. The diameter of the air jet bores 50 are in the range of about 0.010 to 0.040 inches, and preferably in the range of about 0.017 to 0.025 inches. The bores can be either straight or tapered.

As thus can be seen from FIGS. 3 and 4, the longitudinal axis of each of the air jet bores 50 is angled at approximately 10 degrees with respect to a vertical plane passing though the longitudinal axis of the through bore 45 and the center of each air jet bore 50 at the annular groove 46. For example, the longitudinal axis 51 of air jet bore 50*a* is angled approximately 10 degrees relative to a vertical plane passing through the longitudinal axis 52 of through bore 45, and the center point 53 of bore 50*a* at the annular groove 46 in nozzle member 40. As a result, the through bores are functional to direct a plurality of jets or streams of pressurized air, ejected from the bores 50, substantially tangent to the outer periphery of the through bore 45 and the adhesive bead or filament 56 (FIG. 2) ejected therefrom.

As best seen in FIG. 3, it will be appreciated that the cap 35 serves to mount the nozzle member 40 at the lower portion of the nozzle end 14, such that the upper surface 41 of the attachment 40, including the V-groove 46, is in operative communication with the air plenum chamber 30 and, in fact, defines its bottom wall as shown in FIG. 3. It is also appreciated that the through bore 45 is in operative communication with an adhesive passageway 57, just downstream of the valve and valve seat 24, 25.

Figure 5:
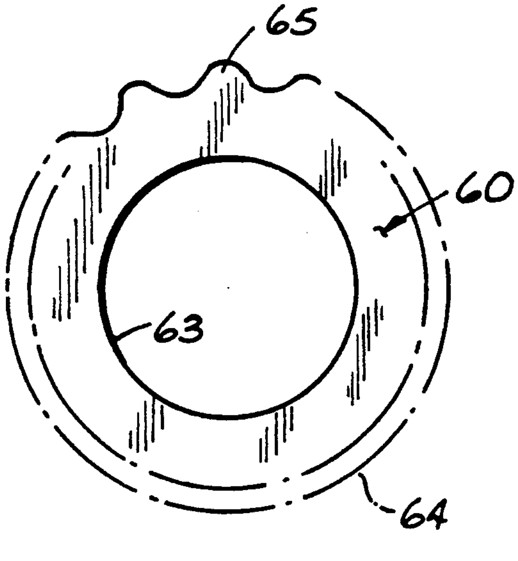
FIG. 5 is a plan view of a first diffuser as shown in FIGS. 2 and 3.
Figure 6:
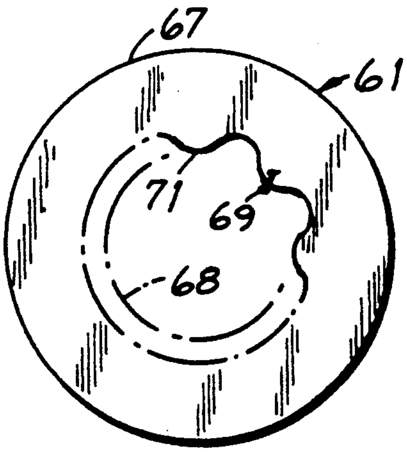
FIG. 6 is a plan view of a second diffuser as shown in FIGS. 2 and 3.

Turning now to FIGS. 3, 5 and 6, it will be appreciated that a diffuser means is disposed within the plenum chamber 30. The diffuser means comprises first and second flanges, disks or baffles such as baffles 60 and 61, which are flat, washer-shaped baffles, for example, having apertures therein. Turning briefly to FIG. 5, the baffle or disk 60 includes an inner aperture defined by inner circular edge 63. The baffle 60 has an outer circumferential edge 64, which is defined generally by a plurality of outwardly radially extending convolutions, projections, or spring fingers 65. It will be appreciated that the outer tips of the projections 65 define the outer circumferential extent of edge 64, which has a diameter which is approximately equal to the diameter of the outer cylindrical wall 32 of the plenum chamber 30. On the other hand, the aperture 63 has a diameter which is greater than the diameter of projection or boss 33 of the nozzle, thereby leaving a space 66 between the aperture 63 and the projection 33.

The projections 65 serve to accommodate a frictional press fit of the baffle 60 into the chamber 30, with the outer tips of the projection 65 engaging on the wall 32.

Turning now to FIG. 6, the baffle 61 also comprises a flat washer-like disk in the form of an annulus, having an outer circumferential edge 67 and an internal aperture 68 defined by a series of inwardly extending convolutions, projections or spring fingers 69.

It will be appreciated that the outer circumferential edge of the baffle 61 has a diameter which is less than the diameter of the outer cylindrical wall 32 of the chamber 30. Thus, when in place, baffle 61 leaves a space 70 between its outer edge 67 and the outer cylindrical wall 32 of the chamber 30.

On the other hand, the aperture 68 in baffle 61 is defined essentially by the radially inwardly extending tips 71 of the projections 69, such that the effective diameter of the aperture is approximately equal to the diameter of the projection 33 from the nozzle 14. This facilitates the press fit of the baffle 61 over that projection 33 for mounting in the chamber 30.

It will thus be appreciated, as perhaps best seen in FIG. 3, that the baffles 60, 61 are inserted as shown into the chamber 30, in a position such that they lie between the port 29 of the air passage way 28 and the bores 50, thereby creating a tortuous or convoluted path for any air passing out of the port 29 and moving toward the nozzle attachment 40. While the baffles appear to be generally perpendicular to the air as it enters chamber 30, it is preferred that they are at least obliquely disposed with respect to the direction of air flowing in chamber 30.

These baffles thus serve to substantially diffuse the air flow introduced into the chamber 30 through the port 29 before that air can move into and through the bores 50. Generally, the air introduced into the chamber 30 through the port 29 engages the first baffle 60 and moves through the space 66, where it engages the second baffle 61 and moves through the space 70 into the area of the chamber just above the nozzle attachment 40. From there, the now diffused air can move into the bores 50 for ejection toward the bead 56 (FIG. 2) to cause that bead or filament 56 to form a spiral configuration or pattern 73, and thereby form loops 74 in an overlapping configuration (such as loops 6 shown in FIG. 1), when deposited on the substrate 21. However, it will be appreciated that the diffusion of the air within the chamber 30 serves to cause the spiral pattern 73 and the loops 74 to be much more uniform in terms of final width "W" of the loops as they are deposited onto a substrate 21 in an overlapping loop pattern, in a configuration such as illustrated in both FIGS. 1 and 2.

In the past, and without the baffling means 60 and 61, it has been found that this width "W" varies or deviates significantly and detrimentally in a number of applications. These wide variations seem to be dependent upon the angular orientation of the nozzle member 40 with respect to the upstream plenum chamber, the ports inletting the air into that chamber, such as for example, port 29 illustrated in FIG. 3, or with respect to the axis of the adhesive filament port.

When the nozzle attachment was removed from the guns shown in U.S. Pat. No. Re. 33,481, such as for cleaning, replacement, or the like, it was generally reinserted without any thought given to the orientation of the nozzle attachment with respect to the chamber 30 and any inlet air port such as the port 29 as illustrated in FIG. 3. Thus, the loops generated from one run to another from the same nozzle, when the nozzle attachment had been reoriented, varied significantly in width to such an extent that undesirable results frequently obtained from one run or operation to the next. Nevertheless, once the diffusing means 60, 61 are utilized, the air is diffused in the chamber 30. Subsequent runs show that the width "W" of the loops depositing on a substrate was rendered substantially constant, with very little variation or deviation. Any variation was substantially reduced in magnitude from the prior variations or deviations obtained with the prior apparatus, as shown in U.S. Pat. No. Re. 33,481. Thus, while the apparatus of that patent is useful for a number of applications, the rendering of loop widths in a much more uniform fashion, as described in this application, accommodates many different environments and applications where the consistent width of the repeating loops and the resulting adhesive stripes made up of a number of overlapping loops of adhesive bead, are critical.

It will be further appreciated that while two baffling disks 60, 61 are described in this application, other baffling means might be used to produce diffusion of air in the chamber 30 and thereby provide loops of more consistent width and less width deviation within each run and between runs and independently of the angular orientation of the nozzle member 40.

Figure 7:
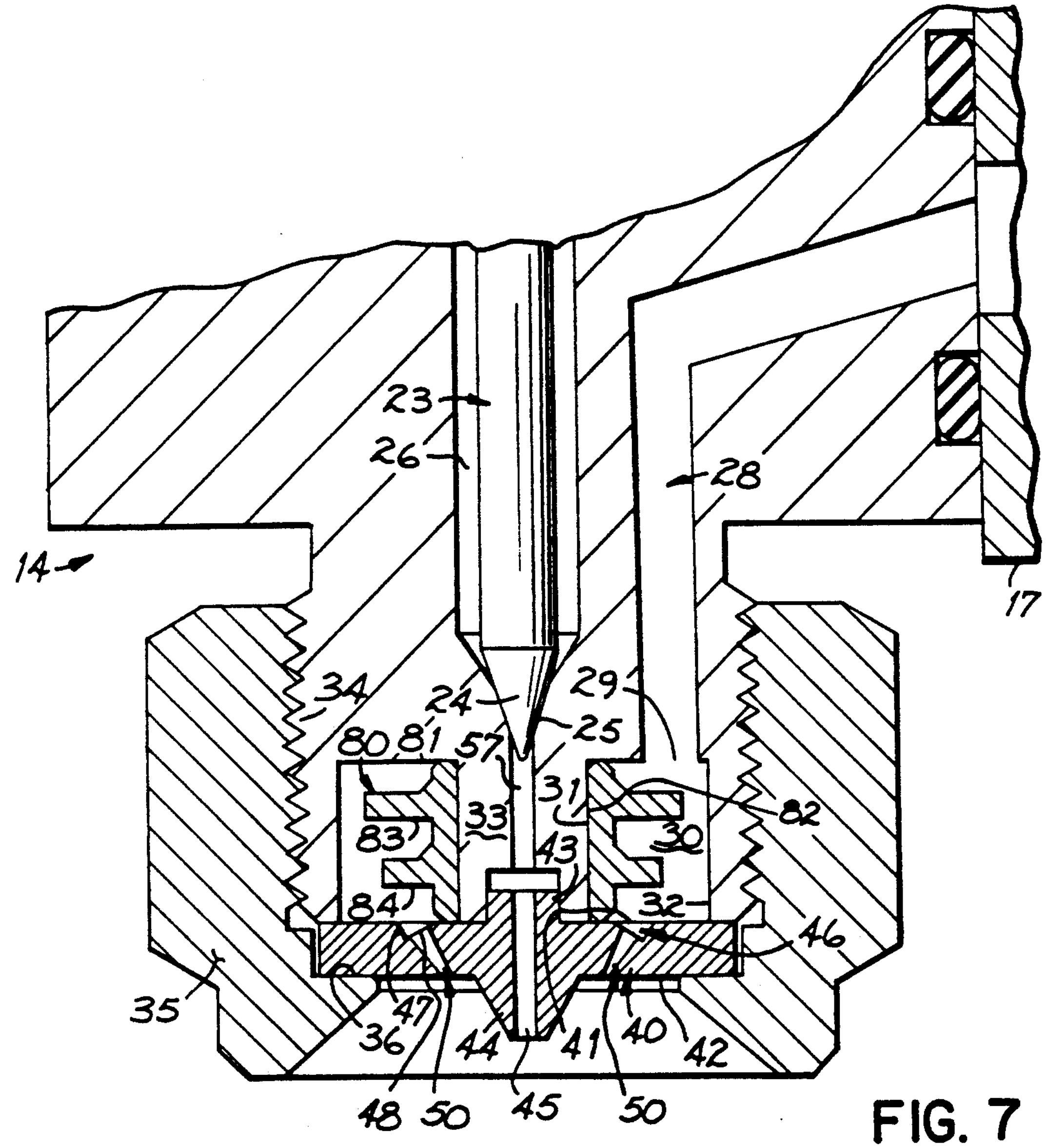
FIG. 7 is a view identical to FIG. 3 except for showing another diffuser embodiment.
Figure 8:
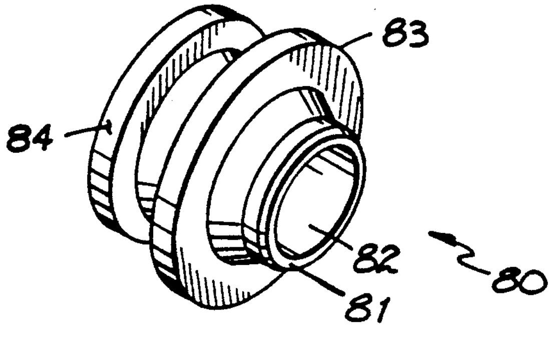
FIG. 8 is an isometric view of the diffuser of FIG. 7.

For example, an alternate embodiment is depicted in FIGS. 7 and 8. FIG. 7 is identical to FIG. 3 except that instead of two baffles 60, 61, a single, one-piece diffusing means 80 is shown. Elements identical to those of FIGS. 1–4 herein will be designated with the same numbers.

The alternate diffusing means 80 shown in FIGS. 7 and 8 differs from the diffusing means of FIGS. 2–6, in that diffusing means 80 is in one piece. Diffusing means 80 comprises a body 81 of generally cylindrical shape having a bore 82 therethrough. Bore 82 has a diameter substantially equal to that of boss 33 so that body 81 fits over that boss. This can be a friction press fit, or a somewhat looser fit so that body 81 can be more easily installed or removed. Preferably body 81 is as long as the projection 33 or as the chamber 30, as shown.

Body 81 is provided with two baffles or flanges 83, 84 of annular configuration. When body 81 is in place, baffles or flanges 83, 84 extend radially into the chamber 30 from a position near or proximate inner wall 31. In this position the baffles 83, 84 are either perpendicular to, or at least oblique to, the path of flow of air in chamber 30 between port 29 and bores 50.

As seen in FIGS. 7 and 8, the lower flange 84 has a first diameter which is less than the diameter of the upper flange 83. Thus when the body 81 is in place in chamber 30, air flowing into chamber 30 from port 29 engages flange 83 which diffuses the air. Air then engages flange 84 which further diffuses the air.

It will be appreciated that neither flange 83 or 84 engage outer wall 32 of chamber 30. Air can spill over the outer circumferential edges of these flanges, between the flanges and wall 32, all about chamber 30 on its way to bores 50. The flanges 83, 84 thus serve to create a tortuous path for the air, diffusing it, so that width deviation in loops of adhesive deposited on a substrate are minimized. It will further be appreciated that this embodiment could be preferable from a manufacturing standpoint as it is of one piece, is easily manufactured, and is easily installed as compared to the two-piece diffusing means described above.

As well, it will be appreciated that other diffuser embodiments could be used, such as, for example, a one-piece diffuser fitting on the outer plenum chamber wall and extending radially into the chamber, or other shaped rings or diffusers fitting on a plenum wall, or loose, such as 0-rings and the like.

Use of the diffuser means described herein substantially reduces loop width deviation between runs where the nozzle member is changed in its angular disposition about the axis of the adhesive through bore 45 (i.e. with respect to the plenum chamber or any air inlet port therein). In one test run, for example, the loop width deviation from the total sample average for the old gun as shown in U.S. Pat. No. Re. 33,481 varied from −3.3% to +5.1% as the nozzle member was rotated, while the loop width when the two ring diffuser described herein was used with the same nozzle member deviated from the total sample average from only −0.6% to +0.7% as the nozzle member was rotated.

In another test run with another nozzle member, the old apparatus produced a loop with deviation from total sample average from −7.4% to +6.8%, while the same nozzle member when used with the two-ring diffuser, produced a loop width deviation from total sample average of only −1.2% to +2.4% as the nozzle was rotated.

In still another test run with a still different nozzle attachment, the old apparatus produced a loop with deviation from total sample average from −9.2% to +7.7%, while the same nozzle member when used with the two-ring diffuser, produced a loop width deviation from total sample average of only −3.2% to +4.3% as the nozzle was rotated.

Accordingly, over a lifetime of use, contemplating nozzle member removal for cleaning, replacement and the like, with the nozzle member constantly shifted in its angular orientation, loop width deviations are substantially minimized, resulting in more consistent results of adhesive deposit and coverage from run-to-run and fewer product rejects and waste.

Accordingly, it will be appreciated that the invention provides for the production of an adhesive stripe on a substrate wherein the stripe comprises a series of overlapping loops of an adhesive bead, wherein the width of each loop is substantially similar to the width of each other loop and independently of the angular orientation of the nozzle attachment or member 40 onto the nozzle and with respect to the nozzle plenum chamber or any air inlet ports into that chamber. The nozzle members can be removed and replaced without regard to any particular alignment and without any necessity for further apparatus to positively align the nozzle attachments as they are replaced, without increasing the expected waste of product which might otherwise occur due to inconsistent adhesive coverage. The invention provides further production of loops of more consistent width within each run for any particular nozzle attachment and between runs for different angular orientations of the same nozzle attachment.

These and other modifications and advantages will become readily apparent to those of ordinary skill in the art without departing from the scope of this invention and the applicant intends to be bound only by the claims appended hereto:

What is claimed is:

1. Apparatus for depositing a filament in a series of overlapping loops on a substrate with said loops having a consistent width, said apparatus comprising:

means for producing a filament;

means for forming a spiral in said filament through the application of a fluid thereto including a nozzle member having a plurality of fluid bores oriented to direct fluid streams toward said filament to form it into a spiral;

a plenum chamber on an upstream side of said bores;

a fluid supply passageway having a port opening into said chamber; and means in said chamber for diffusing said fluid in said chamber and thereby minimizing variation of the width of said loops irrespective of the angular orientation of said nozzle member with respect to said filament.

2. Appartus as in claim 1 wherein said nozzle member includes a filament-forming bore having a longitudinal axis wherein said plenum chamber is in the shape of an annulus having an inner cylindrical wall and an outer cylindrical wall and wherein said diffusing means includes a first diffuser disk disposed in said plenum chamber in a plan transversely and perpendicularly oriented with respect to said axis, and said disk having an aperture therein.

3. Apparatus as in claim 2 wherein said diffusing means includes a second diffuser disk having an aperture therein, said second diffuser disk being disposed in said plenum chamber.

4. Apparatus as in claim 3 wherein said first diffuser disk includes a plurality of projections spaced about an outer circumferential edge thereof, said projections holding said first diffuser disk on said chamber's outer cylindrical wall.

5. Apparatus as in claim 4 wherein said aperture in said first diffuser disk is defined by an internal disk edge spaced from the inner cylindrical wall of said plenum chamber.

6. Apparatus as in claim 5 wherein said second diffuser disk includes a plurality of projections spaced around said aperture in said disk and extending inwardly, said projections holding said second diffuser disk on said inner cylindrical wall of said plenum chamber.

7. Apparatus as in claim 6 wherein said second diffuser disk has an outer circumferential edge spaced from said outer cylindrical wall of said chamber.

8. Apparatus as in claim 7 wherein said first and second diffuser disks are disposed in said plenum chamber between said fluid supply passageway port and said fluid bores.

9. Apparatus as in claim 8 wherein said disks define in said plenum chamber a tortuous path for said fluid.

10. Apparatus as in claim 9 wherein the width of said loops is substantially independent of the angular orientation of said nozzle member with respect to said fluid supply passageway port.

11. Apparatus as in claim 1 wherein said nozzle member comprises a filament bore having a longitudinal axis and wherein said diffusing means comprises a one-piece baffle extending into said chamber transversely with respect to said axis.

12. Apparatus as in claim 11 wherein plenum chamber has a cylindrical inner wall and a cylindrical outer wall and wherein said one-piece baffle has a bore with an interior surface disposed in frictional engagement with said inner wall of said chamber.

13. Apparatus as in claim 12 wherein said one-piece baffle includes two flanges extending radially into said plenum chamber.

14. Apparatus as in claim 13 wherein each flange has an outer circumference and one of said outer circumferences of one of said flanges has a smaller diameter than the outer circumference of another of said flange.

15. Apparatus as in claim 12 wherein said one-piece baffle has a length substantially equal to that of the inner wall of said plenum chamber.

16. Apparatus for depositing a filament in a series of overlapping loops on a substrate with said loops having a consistent width, said apparatus comprising:

- means for producing a filament;
- means for forming a spiral in said filament through the application of a fluid thereto including a nozzle member having a plurality of fluid bores oriented to direct fluid streams toward said filament to form it into a spiral;
- a fluid plenum chamber on an upstream side of said bores, and said chamber having inner and outer walls;
- a fluid supply passageway having a port opening into said plenum chamber; and
- baffle means in said chamber for diffusing said fluid in said chamber and thereby minimizing variation of the width of said loops, said chamber inwardly from at least one wall thereof and disposed in said chamber at least obliquely to fluid flow therein.

17. Apparatus as in claim 16 wherein said baffle means comprise a plurality of flanges extending into said chamber from a position at least proximate at least one wall thereof.

18. Apparatus as in claim 17 wherein said flanges extend into said chamber from positions at least proximate the respective inner and outer walls thereof.

19. Apparatus as in claim 17 wherein said flanges extend into said chamber from a position at least proximate only one respective wall thereof.

20. An apparatus for depositing a stripe of adhesive on a substrate wherein said stripe comprises a series of overlapping loops of an adhesive bead and wherein said apparatus is of the type including an adhesive gun, a nozzle member having an adhesive bead passage and a plurality of spiral-forming fluid bores oriented for directing fluid toward an adhesive bead emanating from said nozzle member to form said bead into a spiral, and a fluid plenum chamber upstream of said nozzle attachment having at least one fluid supply port therein, said chamber being in operative communication with said fluid bores, the improvement comprising:

- diffuser means disposed within said chamber for diffusing fluid therein substantially uniformly and independently of the angular orientation of said nozzle member with respect to said chamber, and for producing a spiral loop pattern in said bead of substantially equal diameter loops independently of said angular orientation or said nozzle member.

21. Apparatus as in claim 20 wherein said diffuser means comprises at least one baffle disposed in said plenum chamber for diffusing fluid therein.

22. Apparatus as in claim 21 including at least two baffles in said plenum chamber.

23. Apparatus as in claim 22 wherein said plenum chamber has an inner cylindrical wall and an outer cylindrical wall and wherein said baffles comprise first and second disks, each having an aperture around said inner cylindrical wall.

24. Apparatus as in claim 23 wherein a first disk is mounted on said outer cylindrical wall of said plenum chamber and is spaced from said inner cylindrical wall of said plenum chamber.

25. Apparatus as in claim 24 wherein said second disk is mounted on said inner cylindrical wall of said plenum chamber and is spaced from said outer cylindrical wall of said plenum chamber.

26. Apparatus as in claim 24 wherein said first disk has an outer circumferential edge defined by a series of projections which engage said outer cylindrical wall of said plenum chamber.

27. Apparatus as in claim 25 wherein said aperture in said second disk is defined in part by a series of inwardly extending projections which engage said inner cylindrical wall of said plenum chamber.

28. Apparatus as in claim 20 wherein said fluid plenum chamber has inner and outer walls and said diffuser means comprises a plurality of baffles extending into said chamber from a position at least proximate said inner wall thereof.

29. Apparatus as in claim 20 wherein said baffles comprise a one-piece diffuser means.

30. A method of depositing a series of substantially even-width overlapping adhesive bead loops on a substrate from a bead generating gun of the type having a nozzle means for emanating a bead and for directing a plurality of fluid streams toward said bead from a plurality of fluid bores to produce a spiral in said bead prior to deposit of bead loops on said substrate, said method comprising the steps, in combination, of:

- supplying spiral forming fluid to a plenum chamber upstream of a plurality of said fluid stream directing bores, and
- diffusing fluid within said chamber prior to its entering said bores for producing substantially even width loops independently of the angular orientation of said bores with respect to said chamber.

31. A method as in claim 31 including directing fluid in a tortuous path within said chamber between a fluid inlet thereto and said bores.

* * * * *

US005194115A

REEXAMINATION CERTIFICATE (2623rd)

United States Patent [19]

Ramspeck et al.

[11] B1 5,194,115

[45] Certificate Issued Jul. 11, 1995

[54] LOOP PRODUCING APPARATUS

[75] Inventors: Alan R. Ramspeck, Cumming; Scott R. Miller, Roswell, both of Ga.

[73] Assignee: Nordson Corp., Westlake, Ohio

Reexamination Request:
No. 90/003,219, Oct. 11, 1993

Reexamination Certificate for:

| | |
|---|---|
| Patent No.: | **5,194,115** |
| Issued: | **Mar. 16, 1993** |
| Appl. No.: | **783,989** |
| Filed: | **Oct. 29, 1991** |

[51] Int. Cl.[6] .............................................. B32B 31/00

[52] U.S. Cl. .................................... 156/578; 156/290; 239/298; 239/370; 239/421

[58] Field of Search ................ 425/7, 10, 66, 76, 72.1, 425/72.2, 97, 130, 131.1, 131.5, 464; 239/422, 423, 424, 426, 433, 8, 553.5

[56] References Cited

U.S. PATENT DOCUMENTS

| | | | |
|---|---|---|---|
| Re. 33,481 | 12/1990 | Ziecker et al. | 239/298 |
| 1,990,823 | 2/1935 | Gustafsson | 299/140.1 |
| 2,303,280 | 11/1942 | Jenkins | 299/140.1 |
| 2,626,122 | 1/1953 | Lammiman | 251/2 |
| 3,379,811 | 4/1968 | Hartmann et al. | 264/210 |
| 3,421,702 | 1/1969 | O'Brien | 239/418 |
| 3,659,151 | 4/1972 | Fabre | 317/3 |
| 3,888,649 | 6/1975 | Simhan | 65/60 |
| 4,031,854 | 6/1977 | Sprague, Jr. | 118/641 |
| 4,055,300 | 10/1977 | Binoche et al. | 239/15 |
| 4,218,019 | 8/1980 | Baldwin et al. | 239/290 |
| 4,502,629 | 3/1985 | McGhee et al. | 239/3 |
| 4,537,357 | 8/1985 | Culbertson | 239/290 |
| 4,815,660 | 3/1989 | Boger et al. | 239/8 |
| 4,983,109 | 1/1991 | Miller et al. | 425/7 |
| 4,993,642 | 2/1991 | Hufgard | 239/300 |
| 5,090,623 | 2/1992 | Burns et al. | 239/301 |
| 5,209,405 | 5/1993 | Robinson et al. | 239/296 |

FOREIGN PATENT DOCUMENTS 656824 9/1951 United Kingdom .

OTHER PUBLICATIONS

European Search Report of Application No. EP 92 11 7255, Dated 05 Jan. 1993.

*Primary Examiner*—James J. Engel

[57] ABSTRACT

An improved loop producing apparatus includes an adhesive gun and a nozzle member for emanating a bead of adhesive in a spiral pattern caused by the direction of air jets toward the adhesive bead as it emanates from the nozzle. A plenum chamber just upstream of the nozzle member is provided with diffusing or baffling means for diffusing the flow of air before it is introduced to the bores in the nozzle member. Overlapping loops of an adhesive bead are deposited onto a substrate in very consistent loop widths and with little loop width variation independently of the angular orientation of the nozzle member.

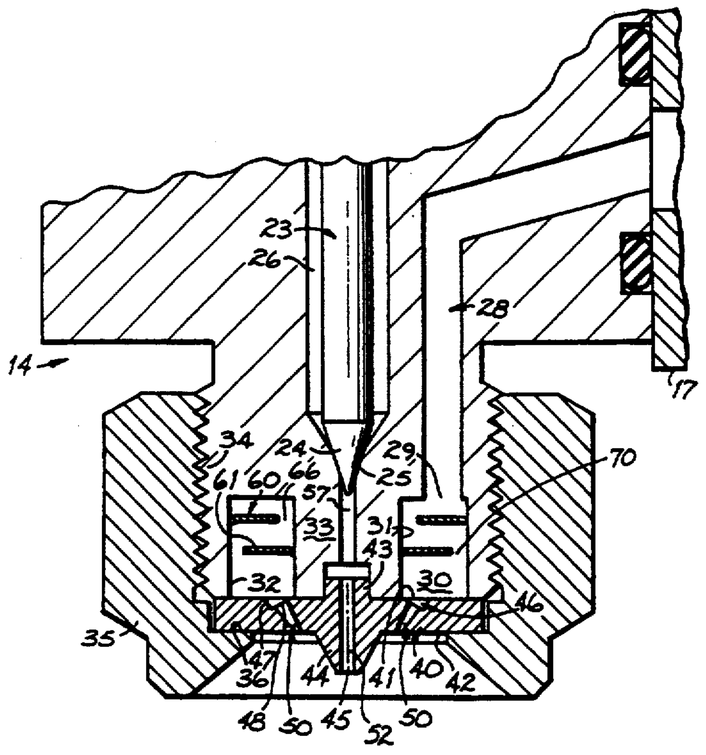

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3, 16-25, 28, 30, & 31 are cancelled.

Claims 4, 11, 26, 27 & 29 are determined to be patentable as amended.

Claims 5-10 & 12-15, dependent on an amended claim, are determined to be patentable.

4. Apparatus as in claim 3 wherein said first diffuser disk includes a plurality of projections spaced about an outer circumferential edge thereof, said projections *frictionally* holding said first diffuser disk on said chamber's outer cylindrical wall.

11. Apparatus as in claim 1 wherein said nozzle member comprises a filament bore having a longitudinal axis and wherein said diffusing means comprises a one-piece baffle *having two radially extending diffusing surfaces* extending into said chamber transversely with respect to said axis.

26. Apparatus as in claim 24 wherein said first disk has an outer circumferential edge defined by a series of projections which *frictionally* engage said outer cylindrical wall of said plenum chamber.

27. Apparatus as in claim 25 wherein said aperture in said second disk is defined in part by a series of inwardly extending projections which *frictionally* engage said inner cylindrical wall of said plenum chamber.

29. Apparatus as in claim [20] *28* wherein said baffles comprise a one-piece diffuser means.

* * * * *